United States Patent
Clough et al.

(10) Patent No.: US 11,202,510 B2
(45) Date of Patent: Dec. 21, 2021

(54) PASSENGER SEATING FOOT PEDESTAL

(71) Applicant: REINHOLD INDUSTRIES, INC., Santa Fe Springs, CA (US)

(72) Inventors: Robert Clough, Stevenson Ranch, CA (US); Kosta Gianakopoulos, Highland Village, TX (US)

(73) Assignee: REINHOLD INDUSTRIES, INC., Santa Fe Springs, CA (US)

( * ) Notice: Subject to any disclaimer, the term of this patent is extended or adjusted under 35 U.S.C. 154(b) by 0 days.

(21) Appl. No.: 17/012,830

(22) Filed: Sep. 4, 2020

(65) Prior Publication Data

US 2021/0068549 A1 Mar. 11, 2021

Related U.S. Application Data

(60) Provisional application No. 62/896,164, filed on Sep. 5, 2019.

(51) Int. Cl.
| | |
|---|---|
| *B60N 3/06* | (2006.01) |
| *A47C 7/50* | (2006.01) |
| *B64D 11/06* | (2006.01) |
| *B61D 33/00* | (2006.01) |
| *B60N 2/90* | (2018.01) |

(52) U.S. Cl.
CPC ............ *A47C 7/5066* (2018.08); *B60N 2/995* (2018.02); *B60N 3/06* (2013.01); *B60N 3/063* (2013.01); *B61D 33/005* (2013.01); *B64D 11/0643* (2014.12)

(58) Field of Classification Search
CPC .......... B60N 2/995; B60N 3/06; B60N 3/063; B64D 11/0643; B61D 33/0007; A47C 7/5066

USPC .................................. 297/423.15, 423.26
See application file for complete search history.

(56) References Cited

U.S. PATENT DOCUMENTS

| | | | |
|---|---|---|---|
| 801,398 A | 10/1905 | Ray | |
| 2,217,352 A | 10/1940 | Todd et al. | |
| 2,284,129 A | 5/1942 | Caesar | |
| 3,462,194 A | 8/1969 | Gielow et al. | |
| 3,632,169 A | 1/1972 | Barecki et al. | |
| 3,744,843 A * | 7/1973 | Barecki ............... | B60N 2/3013 297/316 |
| 5,725,281 A | 3/1998 | Vairinen | |
| 6,375,266 B1 | 4/2002 | Ferguson et al. | |
| 8,246,118 B2 | 8/2012 | Moore | |
| 9,744,894 B2 | 8/2017 | Carlioz et al. | |
| 10,017,088 B2 | 7/2018 | An et al. | |
| 2015/0183345 A1* | 7/2015 | Ketels ..................... | B60N 3/06 297/217.1 |

(Continued)

FOREIGN PATENT DOCUMENTS

| | | |
|---|---|---|
| EP | 355743 A2 | 2/1990 |
| EP | 543050 A1 | 5/1993 |

(Continued)

*Primary Examiner* — Rodney B White
(74) *Attorney, Agent, or Firm* — Hahn Loeser & Parks LLP

(57) ABSTRACT

The present disclosure relates to foot pedestals for passenger vehicles. More specifically, the present disclosure describes a deployable foot pedestal that provides support and comfort to a passenger. The foot pedestal includes an internal torsion spring so that it remains stowed and flush with the rear of the seat back when not in use. It can be deployed for use by the passenger using their foot, or hand.

20 Claims, 5 Drawing Sheets

(56) References Cited

U.S. PATENT DOCUMENTS

| | | |
|---|---|---|
| 2015/0329034 A1* | 11/2015 | Kim .................... E02F 9/16 296/75 |
| 2018/0170551 A1 | 6/2018 | Newell |
| 2018/0236919 A1 | 8/2018 | Newell |
| 2018/0251056 A1 | 9/2018 | Last |
| 2018/0290578 A1 | 10/2018 | Rong et al. |

FOREIGN PATENT DOCUMENTS

| | | |
|---|---|---|
| EP | 751038 A2 | 1/1997 |
| EP | 1362738 A1 | 11/2003 |
| EP | 3398808 A1 | 11/2018 |

\* cited by examiner

PASSENGER SEATING FOOT PEDESTAL

This patent application claims priority to and benefit of U.S. Provisional Application No. 62/896,164, filed Sep. 5, 2019, which is incorporated herein by reference.

BACKGROUND

This disclosure relates to passenger seating for mass transportation. More specifically, the present disclosure relates to a foot pedestal for use in combination with passenger seating for passenger vehicles, such as a passenger aircraft.

Passenger vehicles relied on for mass transportation, such as buses, trains, aircraft, or the like, provide a service for moving passengers from one location to the next. Increasing the passenger count on passenger vehicles is a constant demand. Passenger comfort must also be balanced with passenger capacity.

Some current seating arrangements for mass transportation include aligning rows of seats in a front-to-back configuration along a length of the vehicle with each respective row extending in the direction of the vehicle width. When seated, passengers may find themselves between two other passengers (e.g. middle seat), between another passenger and the side of the vehicle (e.g. window seat), or between another passenger and an aisle (e.g. aisle seat). The passengers are additionally confined within their seat by a seat back of the seat positioned ahead when the seats are oriented in the front-to-back configuration.

Foot pedestals may be provided as a convenience. Foot pedestals allow a passenger the freedom to adjust their feet or leg position while in transit. Prior foot pedestals, however, reduce the space between seats positioned in the front-to-back configuration. Prior foot pedestals also present an obstacle to accessing under-seat storage space. Finally, prior foot pedestals may also present obstacles, or trip hazards, to passengers attempting to exit their seat to reach an aisle. Therefore, what is needed is a foot pedestal for mass transportation that fits seamlessly with a forward seat, that does not interfere with access to under-seat storage space, and/or that does not present an obstacle, or trip hazard, to passengers exiting their seats.

SUMMARY

The present disclosure relates to foot pedestals for passenger vehicles. More specifically, the present disclosure describes a deployable foot pedestal having an internal torsion spring to maintain the foot pedestal in a stowed and flush position when not in use, relative the rear seatback of the seat to which it is attached.

In one example, a deployable foot pedestal comprises a foot paddle, a housing, and a hinge mechanism. The foot paddle comprises a foot support surface and an aperture. The housing comprises a seat attachment mechanism for securing the housing to a structural member of a seat and an insert inserted into the aperture of the foot paddle. The hinge mechanism is formed between the aperture and the insert wherein the aperture is rotatably secured within the housing about the insert. The hinge mechanism further comprises a torsion spring constantly driving the foot paddle into a retracted position.

In some examples the deployable foot pedestal may further comprise a top detent which mates with a top detent of the housing for stopping the rotation of the foot paddle relative the housing at the retracted position while maintaining the torsion spring in constant tension. The deployable foot pedestal may additionally, or alternatively, comprise a bottom detent which mates with a bottom detent of the housing for stopping the rotation of the foot paddle relative the housing at an extended position when an opposing force is applied to the torsion spring where the opposing force is greater than the tension of the torsion spring. In the above examples, the torsion spring may automatically return the foot paddle from the extended position to the retracted position when the opposing force ceases or is released. The torsion spring drives the foot paddle from an extended position to the retracted position. In various examples the deployable foot paddle of the deployable foot pedestal is rotatable in the housing less than ½ rotation.

In some examples the seat attachment mechanism of the deployable foot pedestal is a clamping mechanism. The clamping mechanism may wrap the structural member of the seat. The clamping mechanism may comprise a void within the housing where the structural member of the seat is inserted and secured within the void. The clamping mechanism may additionally, or alternatively, comprise at least one lip which extends about the structural member of the seat when the structural member of the seat is inserted into the housing, such as in the void of the housing.

The foot pedestal may comprise a foot paddle having a width where the width of the foot paddle extending from the housing is greater than the width of the housing. The foot pedestal may also comprise one or more bushings. The bushings may be positioned between the aperture of the foot paddle and the insert of the housing. The torsion spring may be further positioned within the bushing. The bushing may further secure the torsion spring between the housing and the foot paddle.

In some examples a passenger seating system is provided. The passenger seating system comprises a forward seat having a seat spreader. The passenger seating system also comprises a deployable foot pedestal comprising a foot paddle, a housing, and a hinge mechanism. The hinge mechanism is formed between the foot paddle and the housing within the housing. The foot pedestal is secured to the seat spreader by way of the housing. The foot paddle is rotatable within the housing and is in constant tension by way of the hinge mechanism in a direction of the seat spreader such that a foot support surface of the foot paddle mates with the seat spreader. In some examples a profile of the foot support surface mirrors a profile of the seat spreader to which it mates. The hinge mechanism may constantly force the foot paddle into a mating arrangement with the seat spreader except when a greater opposing force is applied to the foot support surface of the foot paddle. The hinge mechanism may maintain the foot paddle in a retracted position except when a greater opposing force is applied to the foot support surface of the foot paddle and wherein the foot paddle is aligned with the top side of the housing in the retracted position.

In various examples the foot pedestal is positioned on a backside of a forward seat and is oriented to a lateral side of the forward seat. The foot paddle may be aligned centrally with a central axis of the seat spreader. In some examples the foot pedestal is positioned above an under-seat storage area below the forward seat when the foot paddle is in a retracted position. In some examples the foot paddle rotates between a retracted position and an extended position wherein the foot paddle is aligned with a top side of the housing in the retracted position and is rotated approximately 90 degrees from the retracted position when in the extended position.

The foregoing and other objects, features, and advantages of the examples will be apparent from the following more detailed descriptions of particular examples as illustrated in the accompanying drawings wherein like reference numbers represent like parts of the examples.

BRIEF DESCRIPTION OF THE DRAWINGS

Reference is made to the accompanying drawings in which particular examples and further benefits of the examples are illustrated as described in more detail in the description below, in which.

DETAILED DESCRIPTION

Figure 1:
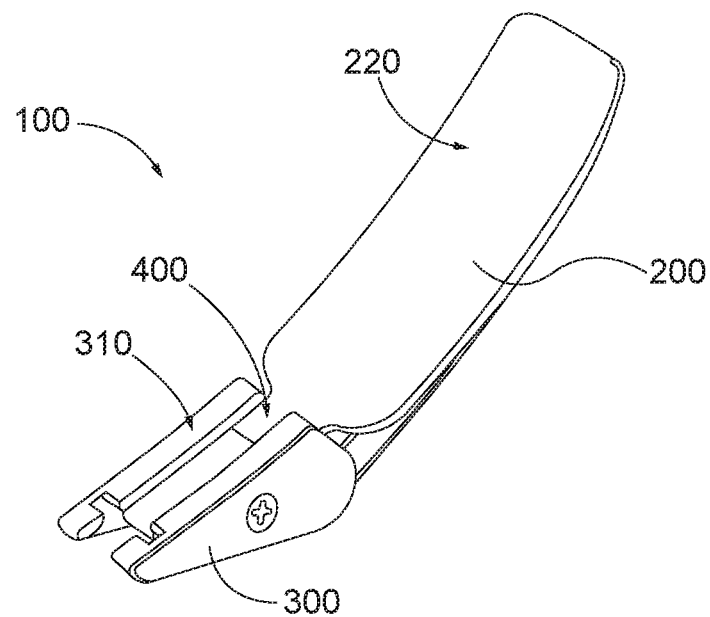
FIG. 1 is a top side perspective view of a foot pedestal, in accordance with an example of the disclosure.

Disclosed herein is a foot pedestal for use in mass transportation, such as in buses, trains, and aircrafts (referred to herein, generally, as "passenger vehicles"). In one aspect, the present foot pedestal fits seamlessly with the frame of a forward seat. In another aspect, the present foot pedestal does not interfere with access to under-seat storage space. In yet another aspect, the present foot pedestal does not present an obstacle, or trip hazard, to passengers exiting a seat. In still yet another aspect, the present foot pedestal may form a part of an original seat and/or may be retrofitted onto an existing seat.

Referring to FIGS. 1-4, a foot pedestal 100 is illustrated. The foot pedestal 100 comprises a foot paddle 200 and a housing 300. A hinge mechanism 400 provides a hinged connection between the foot paddle 200 and the housing 300. More specifically, the hinge mechanism 400 comprises a spring 410 which extends through an aperture 210 of the foot paddle 200, as illustrated by FIG. 5. In the example of FIG. 5, the spring 410 is a torsion spring.

FIG. 1 illustrates the foot pedestal 100 in a retracted position. In the retracted position, the foot support surface 220 of the foot paddle 200 is aligned with a top side 310 of the housing 300. Aligned, as used herein, means substantially continues along the same path. To substantially continue means following a similar path but the path may be offset from one feature to the next. By example, and as will be discussed in greater detail below with respect to a seat spreader, the housing 300 may extend around or about a seat spreader for attachment to the seat spreader. Therefore, the top side 310 of the housing 300 extends above a component of the seat spreader so the seat spreader is partially encased within the housing 300. To accomplish this the top side 310 of the housing is offset from the foot support surface 220 of the foot paddle as the foot paddle 200 does not similarly wrap or encase the seat spreader. Instead, the foot paddle may comprise a curvature which mates with or mirrors the shape of the outside surface of the seat spreader. This provides that the foot paddle 200 is adjacent with the outside surface of the seat spreader when in the retracted position. Still yet, while in the retracted position the foot paddle remains aligned, albeit offset, with the top side 310 of the housing 300 for the reason stated above. In yet another example, such as where the top side 310 of the housing 300 may be secured directly to the face of a seat spreader, as opposed to wrapping a seat spreader, the foot support surface 220 of the foot paddle 200 may be perfectly aligned with a top side of the housing 300. Perfectly aligned means to follow the same path without an offset.

Still referring to FIG. 1, the housing 300 partially encases the foot paddle 200. Specifically, the hinge mechanism 400 is secured between the housing 300 and the foot paddle 200. In specific examples, the hinge mechanism 400 is constructed directly within the foot paddle 200 and the housing 300 for a direct connection between the housing 300 the foot paddle 200. In other words, in this example of the foot pedestal 100 the hinge mechanism 400 is constructed from both the housing 300 and the foot paddle 200. This is in contrast with a hinge mechanism which may be formed by an independent and intermediate structure between the foot paddle and the housing and/or separate from the foot paddle and/or the housing, where the housing is the mechanism for connecting the foot pedestal to a seat. In the present example the housing 300 is thereby directly connected to the foot paddle 200. The hinge mechanism 400 will be described in greater detail with respect to FIG. 5, below.

Figure 2:
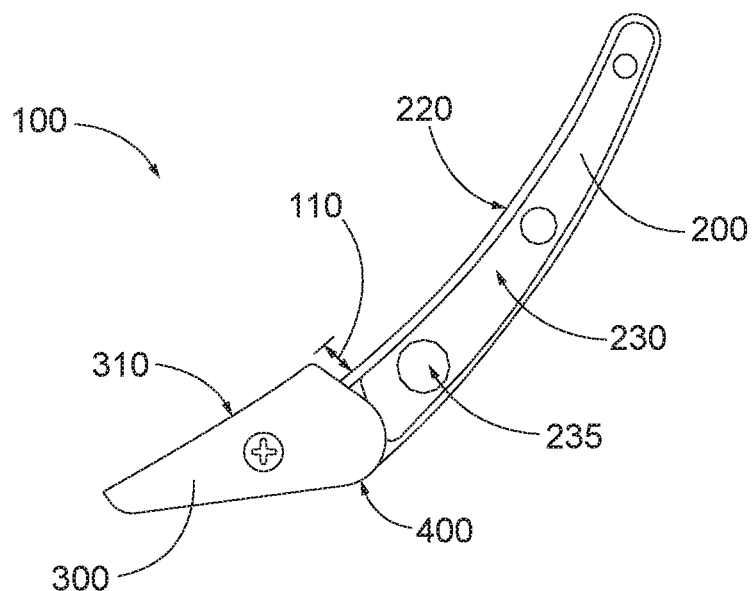
FIG. 2 is a side view of a foot pedestal, in accordance with an example of the disclosure.

Turning now to FIG. 2, a side view of the foot pedestal 100 in a retracted position is illustrated. The offset 110 between the top side 310 and foot paddle 200 is also illustrated. As previously mentioned, although offset, the top side 310 of the housing 300 is said to be aligned with the foot support surface 220 of the foot paddle 200 as the housing 300 and the foot support surface 220 follow a consistent path when in the retracted position. The foot paddle 200 may comprise a paddle frame 230 extending from below the foot support surface 220. The paddle frame 230 of FIG. 2 comprises multiple voids or through-holes 235 for the purpose of weight reduction, such as when used on a passenger aircraft where lightweight components are necessary. The paddle frame 230 may additionally be constructed of a truss structure or other framed structure with voids therein. Alternatively, the paddle frame 230 may be a solid structure. In the example of FIG. 2, the foot paddle 200 comprising the foot support surface 220 and the paddle frame 230 is constructed of a single material. Examples of the material may include metal, plastic or composite materials, or the like. In some examples, the foot paddle may be constructed of a combination of materials, such as, for example, metal, plastic or composite materials, or the like.

Figure 3:
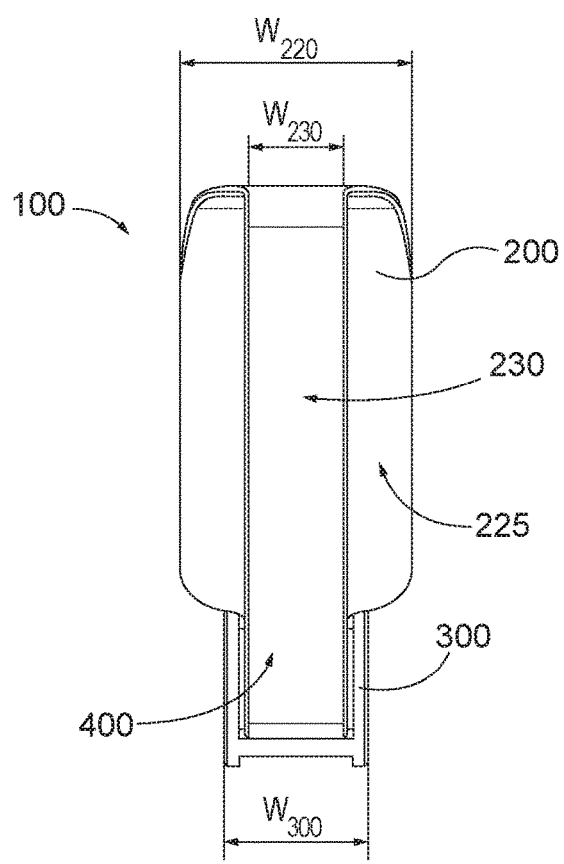
FIG. 3 is bottom view of a foot pedestal, in accordance with an example of the disclosure.

Turning now to FIG. 3 a bottom side of the foot pedestal 100 is illustrated. From the bottom side, a bottom side 225 of the foot support surface 220 is illustrated with the paddle frame 230 extending therefrom. A portion of the foot support surface 220, as illustrated by the bottom side 225 of the foot support surface 220 has a foot support surface width $W_{220}$ greater than a paddle frame width $W_{230}$. The paddle frame width $W_{230}$ is additionally narrower than the housing width $W_{300}$ such that a portion of the paddle frame 230 is positioned within the housing 300 to provide a structure for the hinge mechanism 400. The foot support surface additionally decreases so the foot support surface 220 is inserted into the housing width $W_{220}$.

Figure 4:
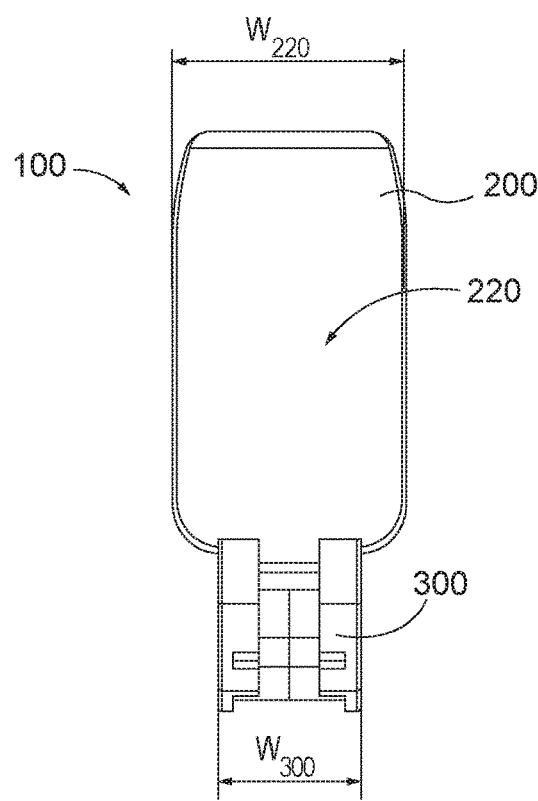
FIG. 4 is a top view of a foot pedestal, in accordance with an example of the disclosure.
Figure 5:
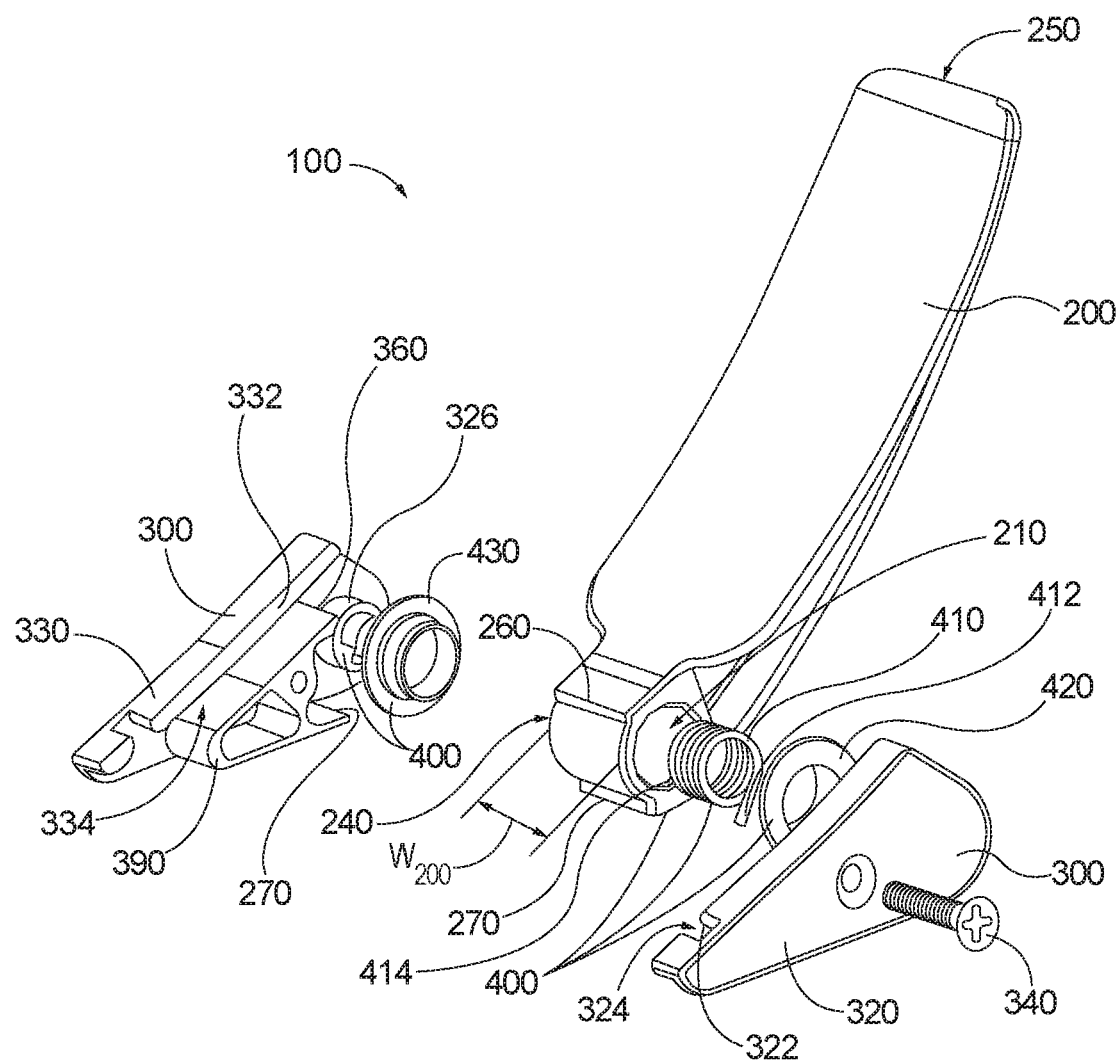
FIG. 5 is an exploded view of the top side perspective view of the foot pedestal of FIG. 1.

FIG. 4 illustrates a top side of the foot pedestal 100. As illustrated from the top side, the foot paddle 200 and foot support surface 220 extends into the housing 300 to be directly supported by the housing 300. This reduces the size and the number of components of the foot pedestal 100 while additionally increasing the structural integrity of the foot pedestal 100. The foot paddle 200 is encased within the housing 300 which is also relied on for securing the foot pedestal 100 to a seat, such as to a seat spreader. As further illustrated by FIG. 4, although the foot paddle 200 is encased within the housing 300 the foot support surface 220 extends from the housing and may be wider than the housing 300, thereby, providing greater support for a passenger's foot. As illustrated by FIG. 3, the foot support surface 220 may be further supported by the paddle frame 230.

As illustrated by FIGS. 1-2, the foot paddle 200 of the foot pedestal 100 may comprise a curvature. In the example of FIGS. 1-2, the foot support surface 220 of the foot paddle 200 is concave. As will be illustrated by FIGS. 6-7, this curvature is provided for mating the foot support surface 220 to the back side of a seat, such as a seat spreader, when in a retracted position. This reduces or eliminates any void area which may otherwise be created by a foot platform. Reducing such void area between the foot pedestal 100 and the seat otherwise maintains space needed in other areas of a passenger vehicle cabin, such as under-seat storage and/or space needed for passenger leg room. Also, by reducing such void area between the foot pedestal and the seat, the foot pedestal is stowed in such a manner that it does not impede a passenger's exit from their seat, across the seating row, to an aisle. The reduction of a void between the foot pedestal and the seat additionally prevents a passenger or their belongings from snagging or getting caught between a foot pedestal and a seat. This is not only a convenience but increases safety in the event of emergency egress.

Turning now to FIG. 5, an exploded view of a foot pedestal 100 is illustrated. The foot paddle 200 of the foot pedestal 100 comprises an aperture 210. The aperture 210 extends the width $W_{200}$ of the foot paddle 200 at one longitudinal end 240 of the foot paddle 200 positioned at the housing 300. The opposing, or second, longitudinal end 250 of the foot paddle 200 is positioned opposite the housing 300. A hinge mechanism 400 is formed directly between the foot paddle 200 and the housing 300. A spring 410 of the hinge mechanism 400 may be inserted in through the aperture 210 where the spring 410 may be further secured to or bias the housing 300. In this example, bushings 420, 430 are provided at each opposing sides of the foot paddle width $W_{200}$ at the aperture 210. The bushings 420, 430 are secured to or bias opposing sides of the housing 300. The bushings 420, 430 may be provided to secure the spring 410 of the hinge mechanism 400 between the aperture 210 of the foot paddle 200 and the opposing sides of the housing 300 while maintaining rotational movement between the foot paddle 200 and the housing 300. More specifically, the bushings 420, 430 may be provided to impart movement between the foot paddle 200 and the housing while providing a mechanism to secure at least a first terminal end 412 of the spring 410 to a bushing 420 and/or between the bushing 420 and the housing 300, such as in the example of a torsion spring. The second terminal 414 end may be secured within the aperture 210 of the foot paddle 200 and/or to the foot paddle 200 directly. Alternatively, the second terminal end 414 may be secured to the second bushing 430 opposite the first bushing. By securing each end of the spring 410, the foot paddle 200 may be maintained in constant tension of the spring. In some examples multiple springs may be provided. By example, one spring may be provided at one bushing and yet another spring may be provided at the other bushing.

In the example of FIG. 5, the spring 410 of the hinge mechanism 400 is a torsion spring. In this example the spring, alone, controls the movement of the foot paddle 200 relative the housing 300. The torsion spring is maintained in constant tension (or torque) forcing and maintaining the foot paddle 200 in the retracted position unless a greater opposing force is applied to the foot paddle (e.g. such as the weight of a passenger's foot). The greater opposing force forces the foot paddle into an extended position, or a position between the retracted position and the extended position, whereby a passenger is resting their foot on the foot paddle. Upon releasing the greater opposing force the foot paddle immediately returns to the retracted position under the tension created by the spring mechanism. No ratcheting mechanisms are present to maintain the foot pedestal in a position. No intermediate teeth or pawls are present to control an intermediate position of the foot pedestal. Only the spring mechanism is relied on to maintain the foot pedestal in the retracted, or stowed position, and a greater opposing force, such as from a passenger, is relied on to force the foot pedestal into the extended position when in use. By way of this mechanism, the present foot pedestal is constantly maintained in a retracted position so not to impede upon passenger access, passenger leg room, and or under-seat storage space unless a greater opposing force is applied by the passenger.

The housing of the example in FIG. 5 includes two parts where the first housing part 320 is connected to a second housing part 330 by way of a screw 340. Either the first housing part 320, the second housing part 330, or both, comprise an internal structure 390 for receiving the foot paddle 200, the bushings 420, 430, the spring 410, a seat spreader, and/or the opposing part. In FIG. 5, a seat attachment mechanism is formed between each housing part 320, 330, where each housing part 320, 330 comprises an upper lip 322, 332, respectively, with a respective void 324, 334 adjacent. As will be illustrated by FIGS. 6-7, a frame of the seat spreader is inserted within a respective void 324, 334 to below the respective lip 322, 332. Upon connecting the first housing part 320 to the second housing part 330 the seat spreader is positioned within the housing 300 and the foot pedestal is secured to the seat spreader. Similarly, each housing part 320, 330 comprises an insert 326 which is inserted into the aperture 210 of the foot paddle 200. As indicated above, bushings 420, 430 may be inserted between the inserts 326 and the aperture 210 to increase the strength between the housing and the foot paddle, to decrease friction between the housing and the foot paddle, to serve as the insert, and/or to secure the spring to the housing and/or between the housing and the foot paddle. Upon connecting the first housing part 320 to the second housing part 330 the inserts 326 are inserted into the aperture 210 of the foot paddle 200 and the foot paddle 200 is rotatably secured within the housing 300.

By providing two separable housing parts 320, 330, the foot pedestal 100 maybe be retrofitted to an existing seat spreader. Additionally, or alternatively, the foot pedestal 100 may be removed from or relocated on a seat spreader. In other examples, the housing may be a single unit and/or may be formed directly on or be a part of a seat spreader. In still yet other examples, the housing may be secured directly to the face of a seat spreader or any other part of a seat. Any mechanical means, or combination of mechanical means, known in the art may be relied on to secure the two separable housing parts 320, 330 together, to secure the foot paddle to the housing, to secure the spring between the foot paddle and the housing, to secure the housing to a seat, to form a seat attachment mechanism, and/or to maintain the foot paddle in constant tension. Examples of such means may include any fastener, including but not limited to screws, bolts, pins, adhesives, or the like. Other examples of maintaining the foot paddle in constant tension may include other springs, gas springs, pressure systems, or the like.

The retracted position and/or the extended position of the foot pedestal 100 may be defined between the housing 300 and the foot paddle 200 and/or may be defined between the foot paddle and the seat, such as a seat spreader. As illustrated by FIG. 5, one or more detents 260, 270 may be attached to or formed on the foot paddle 200 within the housing 300. The internal structure 390 of the housing may have corresponding detents 360, 370 for mating with each respective detent 260, 270 of the foot paddle 200. The detents may limit the range of rotation of the foot paddle 200 relative the housing 300. By example, the top detent 260 of the foot paddle may mate with or be stopped by the top detent 360 of the housing to stop the rotation of the foot paddle 200 that is otherwise imparted by the hinge mechanism 400. In other words, the mating relationship between top detent 260 of the foot paddle 200 and the top detent 360 of the housing 300 is relied on to stop the foot paddle in the retracted position or prevent the foot paddle from rotating beyond the retracted position, opposite the extended position whereby the foot paddle is maintained under constant tension (or torque) by way of the hinge mechanism. In other examples, no top detents may be provided, and the retracted position is maintained by direct contact between the foot support surface 220 of the foot paddle 200 and a seat, such as a seat spreader. The bottom detent 270 of the foot paddle may mate with or be stopped by the bottom detent 370 of the housing. This also may be relied on to stop the rotation of the foot paddle relative the housing but at the extended position. By stopping the foot paddle in the extended position, the foot support surface 220 of the foot paddle 200 is maintained at a position where a passenger may rest a foot on the foot pedestal 100. Other manners of controlling the rotation of a foot paddle 200, or providing outermost limitations on the rotation, within a housing may be provided as known by one of ordinary skill in the art.

Figure 6:
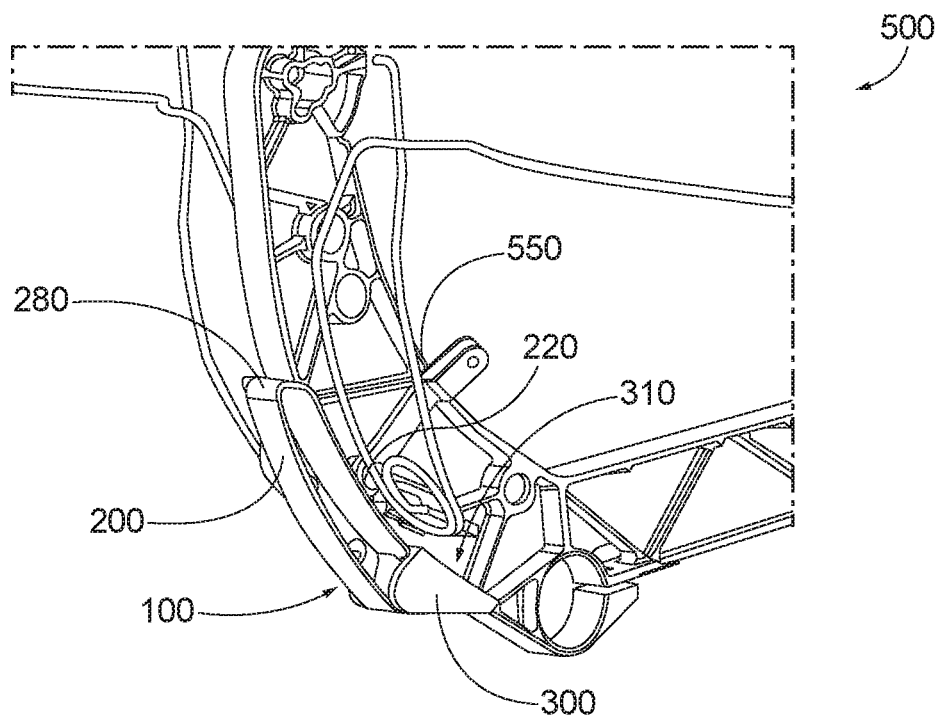
FIG. 6 is a perspective view of a passenger seating structure having a foot pedestal attached thereto with the foot pedestal in a retracted position, in accordance with an example of the disclosure.
Figure 7:
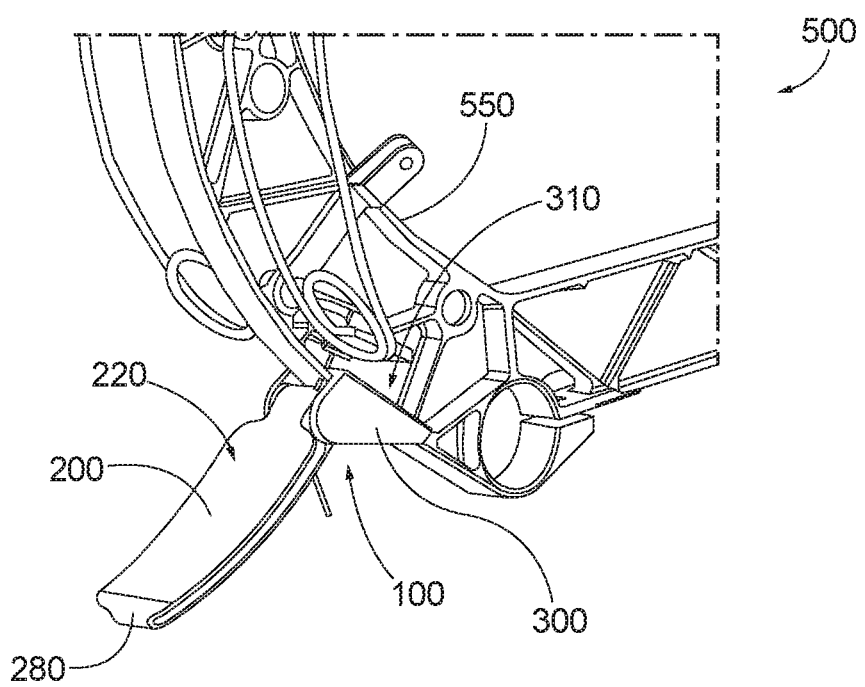
FIG. 7 is a perspective view of a passenger seating structure having a foot pedestal attached thereto with the foot pedestal in an extended position, in accordance with an example of the disclosure.

Turning now to FIGS. 6-7, the structure of passenger vehicle seat 500 is illustrated. The passenger vehicle seat 500 further comprises a seat spreader 550. The passenger vehicle seat 500 of the present example is a forward seat in a passenger vehicle seat arrangement where the seats are positioned in a front-to-back arrangement. By example, a passenger seated in a seat positioned behind the illustrated forward seat 500 would be facing the backside of the forward seat 500.

FIG. 6 illustrates a foot pedestal 100 that is in a retracted position. FIG. 7 illustrates a foot pedestal 100 that is in an extended position. In one example the retracted position is approximately 90 degrees from the extended position, where approximately is +/−10 degrees. The housing 300 is secured to a frame member of the seat spreader 550 by wrapping the frame member of the seat spreader 550 where opposing sides of the frame member are secured within a void 321 of the first housing part 320 and a void 331 of the second housing part 330 respectively. The lip 322, 332 of each respective housing parts 320, 330 further maintains the frame member of the seat spreader 550 within the housing 300 and, thereby, secures the housing 300 and foot pedestal 100 to the seat 500. Since the lips 322, 332 of the housing 300 wrap and extend around the frame member of the seat spreader 550 the foot support surface 220 is offset from the top side 310 of the housing 300 but is aligned with the housing 300, when in the retracted position as illustrated by FIG. 6. The foot support surface 220 of the foot paddle 200, however, mates with the outside surface of the seat 500, or seat spreader 550. In specific examples, the foot support surface 220 is a mirrored shape of the outside surface of the seat 500, or seat spreader 550, and is flush with the outside surface of the seat 500, or seat spreader 550, when in the retracted position. The outside surface of the seat 500, or seat spreader 550, may be relied on to stop the rotation of the foot paddle within the housing which is in constant tension (or torque) by way of the hinge mechanism. Additionally, or alternatively, detent(s) as described with respect to FIG. 5 may stop the rotation of the foot paddle within the housing.

In FIG. 7, the foot pedestal is in an extended position. In the extended position, the foot support surface 220 is rotated away from the backside of the seat 500, or seat spreader 550. In the extended position, the foot support surface 220 is no longer aligned with the top side 310 of the housing 300. Instead, the foot support surface 220 is rotated, relative the housing 300, in a direction toward becoming perpendicular to the top side 310 of the housing 300. A bottom detent 270 of the foot paddle 200 and a bottom detent 370 of the housing 300 may mate within the housing 300 to stop the rotation of the foot paddle 200, relative the housing 300, into the extended position. In the extended position, the foot paddle remains in constant tension (or torque) under the spring mechanism producing a force that drives the foot support surface 220 of the paddle 200 back toward the seat 500, or seat spreader 550. The only thing maintaining the foot pedestal 100 in the extended position is a force applied independent of the hinge mechanism 400 and/or independent of the foot pedestal 100, such as a forced imparted by a passenger onto the top of the foot support surface 220 that is greater than and opposes the tension (or torque) imparted by the hinge mechanism 400.

As illustrated by both FIGS. 6-7, the foot paddle 200 may additionally comprise a lip 280 at the top edge at the second longitudinal end 250 of the foot paddle. The lip may be and/or include a radiused edge such as that illustrated in the present example. A void may be present between the lip 280 to form a location where a passenger may insert their foot or hand to create a grip between the passenger and the foot pedestal. This allows the passenger to grip and drive the foot paddle from the retracted position to the extended position.

Figure 8:
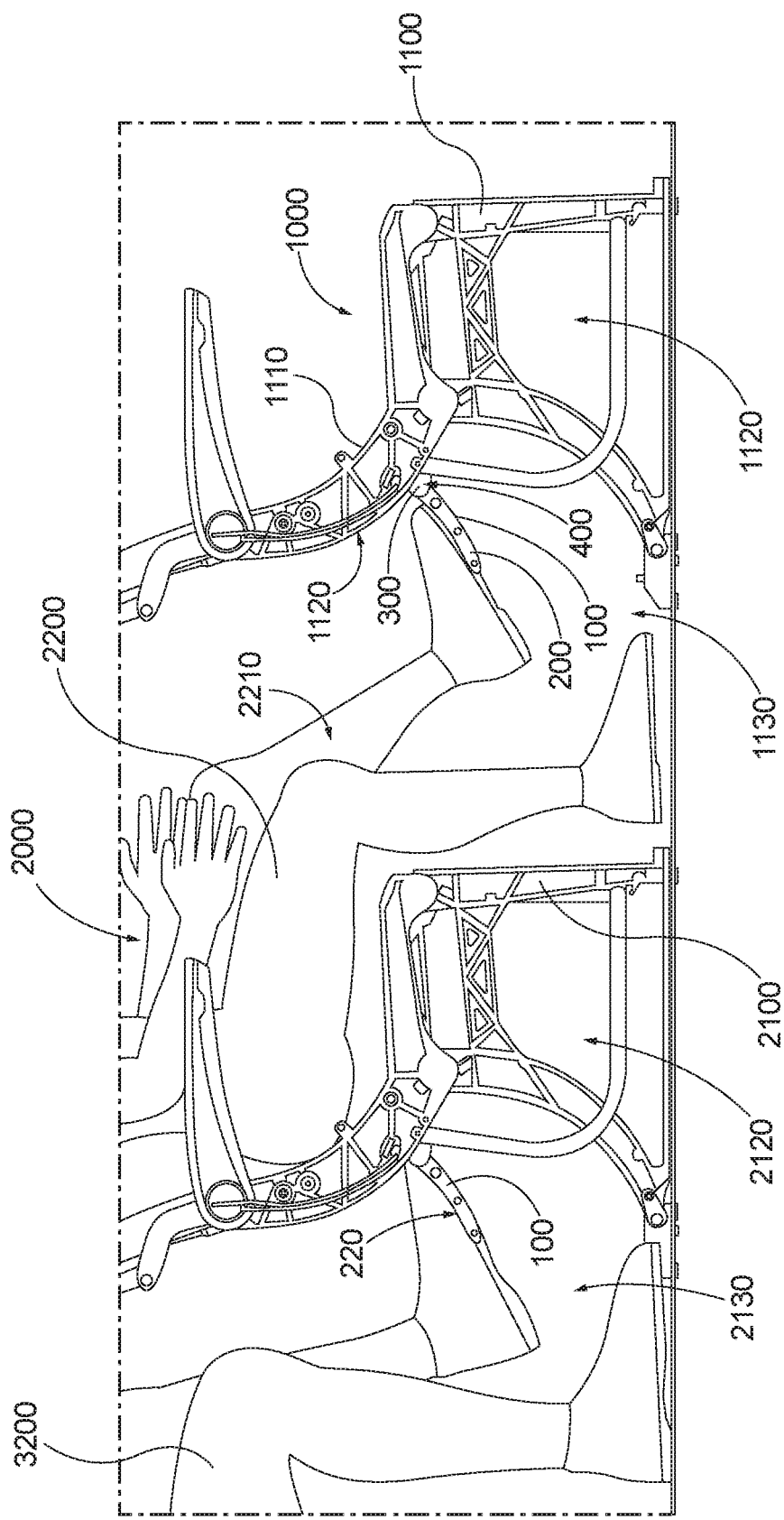
FIG. 8 is a side view of multiple rows of passenger vehicle seats with passengers utilizing foot pedestals, in accordance with an example of the disclosure.

FIG. 8 illustrates multiple rows of seats positioned in a front-to-back arrangement. The seats of each respective row are illustrated as a cross-section. A first seat 1100 of a first row 1000 is illustrated. A first seat 2100 of a second row 2000 is illustrated with a passenger 2200 seated therein. And a passenger 3200 who is seated in a first seat of a third row is illustrated. A foot pedestal 100 is secured to the back side 1120 of a seat spreader 1110 of the first seat 1100. Specifically, the housing 300 of the foot pedestal 100 is secured to the back side 1120 of a seat spreader 1110. The passenger 2200 seated in the first seat 2100 of the second row 2000 has their left foot 2210 positioned upon the foot support surface 220 of a foot paddle 200 of the foot pedestal 100. With the foot positioned upon the foot pedestal 100, the foot paddle 200 is in an extended position. However, once the passenger removes their foot from the foot paddle 200 of the foot pedestal 100 the foot paddle will return to a retracted position where the foot support surface 220 of the foot paddle 200 mates with the back side of the seat, or seat spreader by way of the hinge mechanism 400 within the housing 300. Like the passenger 2200 seated in a first seat 2100 of the second row, the passenger 3200 seated in the third row is additionally resting their foot 3210 upon the foot support surface 220, maintaining the foot pedestal in the extended position.

FIG. 8 also illustrates the previously identified benefits described in relation to the present foot pedestal. Specifically, when in the retracted position, where the foot paddle mates with the back side of the seat, the foot pedestal is maintained outside of the aisle, or pathway, 1130, 2130 between each row of seats. Further, since the foot pedestal is in constant tension (or torque) and returns to the retracted position when not in use it is maintained outside of the aisles, or pathways, 1130, 2130 without further assistance from the passengers or passenger vehicle personnel. Moreover, when in the retracted position the foot pedestal is additionally maintained out of the way of the under-seat storage void 1120, 2120 and/or the passenger's access or path into the under-seat storage void 1120, 2120. Returning to FIGS. 6-7, since the foot pedestal is secured to a seat spreader and does not span a width of the entire seat, the foot pedestal is maintained out of the way of the under-seat storage void 1120, 2120 in the lateral direction, as well. Specifically, when the seat spreader is a perimeter frame of a seat and is positioned to one lateral side of the seat, or the other, the foot pedestal is additionally isolated to one side of the seat or the other in line with the seat spreader. Thereby, the foot pedestal is maintained to one lateral side, or the other, of the under-seat storage void.

While this invention has been described with reference to examples thereof, it shall be understood that such description is by way of illustration only and should not be construed as limiting the scope of the claimed examples. Accordingly, the scope and content of the examples are to be defined only by the terms of the following claims. Furthermore, it is understood that the features of any example discussed herein may be combined with one or more features of any one or more examples otherwise discussed or contemplated herein unless otherwise stated.

What is claimed is:

1. A deployable foot pedestal comprising:
a foot paddle comprising a foot support surface and an aperture;
a housing comprising a seat attachment mechanism for securing the housing to a structural member of a seat and an insert inserted into the aperture of the foot paddle; and
a hinge mechanism formed between the aperture and the insert wherein the aperture is rotatably secured within the housing about the insert allowing rotation of the foot paddle and wherein the hinge mechanism further comprises a torsion spring constantly driving the foot paddle into a retracted position.

2. The deployable foot pedestal of claim 1 wherein the foot paddle comprises a top detent which mates with a top detent of the housing for stopping the rotation of the foot paddle relative the housing at the retracted position while maintaining the torsion spring in constant tension.

3. The deployable foot pedestal of claim 1 wherein the foot paddle comprises a bottom detent which mates with a bottom detent of the housing for stopping the rotation of the foot paddle relative the housing at an extended position when an opposing force is applied to the torsion spring where the opposing force is greater than the tension of the torsion spring.

4. The deployable foot pedestal of claim 3 wherein the torsion spring automatically returns the foot paddle from the extended position to the retracted position when the opposing force ceases.

5. The deployable foot pedestal of claim 1 comprises a means limiting the rotation of the foot paddle within the housing.

6. The deployable foot pedestal of claim 1 wherein the torsion spring drives the foot paddle from an extended position to the retracted position.

7. The deployable foot pedestal of claim 1 wherein the seat attachment mechanism is a clamping mechanism that wraps the structural member of the seat.

8. The deployable foot pedestal of claim 7 wherein the clamping mechanism comprises a void within the housing wherein the structural member of the seat is inserted and secured within the void.

9. The deployable foot pedestal of claim 8 wherein the clamping mechanism comprises at least one lip which extends about the structural member of the seat when the structural member of the seat is inserted into the void within the housing.

10. The deployable foot pedestal of claim 1 wherein a width of the foot paddle extending from the housing is greater than a width of the housing.

11. The deployable foot pedestal of claim 1 wherein a bushing is positioned between the aperture of the foot paddle and the insert of the housing.

12. The deployable foot pedestal of claim 11 wherein the torsion spring is positioned within the hushing and the hushing further secures the torsion spring between the housing and the foot paddle.

13. A passenger seating system comprising:
a forward seat having a seat spreader;
a deployable foot pedestal comprising a foot paddle, a housing, and a hinge mechanism formed between the foot paddle and the housing within the housing;
wherein the deployable foot pedestal is secured to the seat spreader by way of the housing; and
wherein the foot paddle is rotatable within the housing and is in constant tension by way of the hinge mechanism in a direction of the seat spreader such that a foot support surface of the foot paddle mates with the seat spreader.

14. The passenger seating system of claim 13 wherein a profile of the foot support surface of the foot paddle is a mirror of a profile of the seat spreader to which it mates.

15. The passenger seating system of claim 13 wherein the foot pedestal is positioned on a backside of a forward seat and is oriented to a lateral side of the forward seat.

16. The passenger seating system of claim 13 wherein the foot pedestal is positioned above an under-seat storage area below the forward seat when the foot paddle is in a retracted position.

17. The passenger seating system of claim 13 wherein the foot paddle is aligned centrally with a central axis of the seat spreader.

18. The passenger seating system of claim 13 wherein the hinge mechanism constantly forces the foot paddle into a mating arrangement with the seat spreader except when a greater opposing force is applied to the foot support surface of the foot paddle.

19. The passenger seating system of claim 13 wherein the hinge mechanism maintains the foot paddle in a retracted position except when a greater opposing force is applied to the foot support surface of the foot paddle and wherein the foot paddle is aligned with a top side of the housing in the retracted position.

20. The passenger seating system of claim 13 wherein the foot paddle rotates between a retracted position and an extended position wherein the foot paddle is aligned with a top side of the housing in the retracted position and is rotated approximately 90 degrees from the retracted position when in the extended position.

* * * * *

UNITED STATES PATENT AND TRADEMARK OFFICE
CERTIFICATE OF CORRECTION

Page 1 of 1

PATENT NO. : 11,202,510 B2
APPLICATION NO. : 17/012830
DATED : December 21, 2021
INVENTOR(S) : Clough et al.

It is certified that error appears in the above-identified patent and that said Letters Patent is hereby corrected as shown below:

In the Claims

Please replace the words "hushing" with "bushing" in Claim 12, Column 10, Lines 31-32

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*